United States Patent [19]

Sonoda

[11] Patent Number: 4,765,040
[45] Date of Patent: Aug. 23, 1988

[54] EMERGENCY RELEASE DEVICE FOR BACKPACK-TYPE WORKING MACHINE

[75] Inventor: Satoshi Sonoda, Tokyo, Japan

[73] Assignee: Kioritz Corporation, Tokyo, Japan

[21] Appl. No.: 120,134

[22] Filed: Nov. 13, 1987

[30] Foreign Application Priority Data

Nov. 14, 1986 [JP] Japan .................... 61-174886[U]

[51] Int. Cl.[4] .................... A44B 11/17; B25G 3/18
[52] U.S. Cl. ........................ 24/656; 24/658; 403/324; 403/327
[58] Field of Search ............ 24/650, 651, 652, 653, 24/654, 655, 656, 657, 658; 403/324, 325, 327; 294/82.34

[56] References Cited

U.S. PATENT DOCUMENTS

| | | | |
|---|---|---|---|
| 693,595 | 2/1902 | Frazier | 24/656 |
| 3,984,191 | 10/1976 | Doty | 24/656 |
| 3,990,113 | 11/1976 | Coenen | 24/656 |
| 4,105,347 | 8/1978 | Gossage | 403/327 |

Primary Examiner—Victor N. Sakran
Attorney, Agent, or Firm—Browdy and Neimark

[57] ABSTRACT

An emergency release device for a backpack-type working machine in which a connecting member whose upper portion is connected to the lower end portion of a shoulder band is formed with a groove slot whose lower portion opens and into which a waist band and a main part of a shaft member can loosely fit, and the groove slot forms an enlarged groove slot portion being capable of engagement with an enlarged end portion of the shaft member.

1 Claim, 2 Drawing Sheets

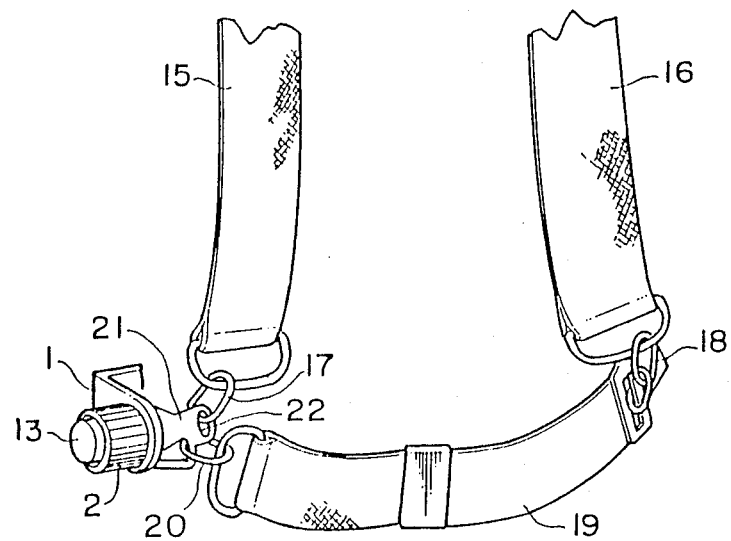
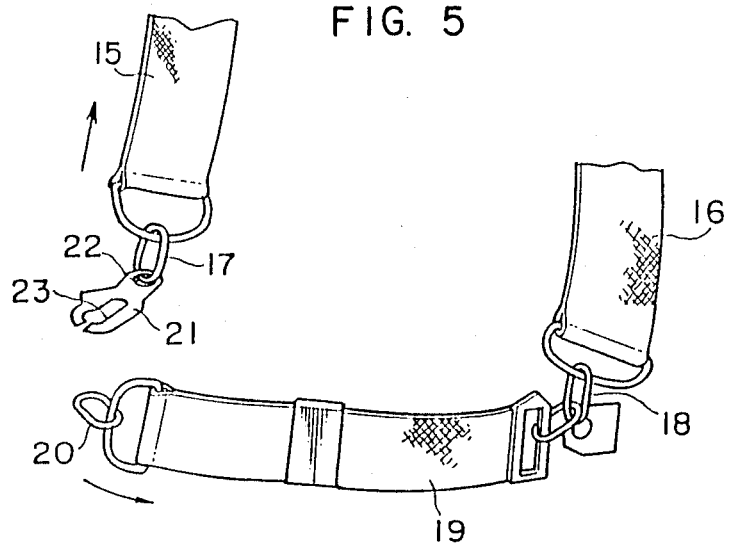

EMERGENCY RELEASE DEVICE FOR BACKPACK-TYPE WORKING MACHINE

BACKGROUND OF THE INVENTION:

1. Field of the Invention:

This invention relates to an emergency release device for a backpack-type working machine.

2. Description of the Prior Art:

Backpack-type working machines such as a backpack-type agricultural chemical sprayer or a grass cutter has usually utilized a pair of shoulder bands from the machine body portion, which are arranged to bear the working machine on the back of the operator during operation. Some working machines of this type provide, besides the shoulder bands, a waist band from the machine body to be attached around the abdominal region of the operator permitting the working machine to be in close contact with the operator body in a stable condition, to keep the operator comfortable when carrying the load with the shoulders and to improve operation efficiency. This backpack-type working machine is generally provided with an emergency release device for promptly dislodging the machine from the operator's body when an emergency happens during operation, but in case of the working machine including both shoulder and waist bands, some additional means is necessary in order to separate the shoulder bands from the waist bands for emergencies. This causes problems such as, making the structure for the working machine complicated, and the dislodging operation of the working machine becomes troublesome because each of the shoulder and waist bands have to be disengaged separately from the operator.

SUMMARY OF THE INVENTION

Accordingly, one object of the present invention is to solve these defects in an emergency release device for backpack-type working machines, and to provide an improved emergency release device having a simple structure readily operable for backpack-type working machines.

That is, the emergency release device for a working machine according to the present invention is characterized in that the release device comprises a cylindrical guard member mounted on the body portion of the working machine, a shaft member which includes a main part slidably extending through a bore in the boss portion of the guard member and an enlarged end portion formed thereof, a button member attached on the other end portion of the shaft member, a spring exerting force between the guard member and the button member and biasing the enlarged end portion to contact with the boss portion of the guard member, and a connecting member whose upper portion is connected to the lower end portion of the shoulder band, and in that the connecting member is formed with a groove slot whose lower portion opens and into which a waist band and the main part of the shaft memoer can loosely fit, and the groove slot forms an enlarged groove slot portion which can be engaged with the enlarged and portion of the shaft member.

In such an arrangement, according to the present invention, the waist band is engaged with the groove slot of the connecting member while the button member is forced into the guard member to move the shaft member axially against the spring force. The connecting member is then inserted into the receiving space so that the main part of the shaft member protruding out of the guard member enters in the groove slot to align with the center of the enlarged groove slot portion. Under these conditions, when the button member, previously advanced into the guard member, is released, the enlarged end portion of the shaft member engages with the enlarged groove slot so that the shoulder and waist bands are securely connected to the body portion of the machine. When in an emergency, the button member is pushed in, the enlarged end portion of the shaft member is disengaged from the enlarged groove slot portion of the connecting member, whereby the working machine can be easily released from the operator.

Thus, according to the present invention, the shoulder bands and the waist band can be removed simultaneously by a one-touch operation of a single release device for removing the working machine from the operator during an emergency to assure the security to the operator, and also, since the number of the components is minimized, a simple structure is obtained and easy handling and operation can be done.

BRIEF DESCRIPTION OF THE DRAWINGS

FIG. 4 is a perspective view showing the shoulder bands and a waist band joined to one another by the device shown in FIG. 1, and FIG 5 is a perspective view showing the condition of the shoulder bands and the waist band upon being released in an emergency.

DESCRIPTION OF THE PREFERRED EMBODIMENT

Figure 1:
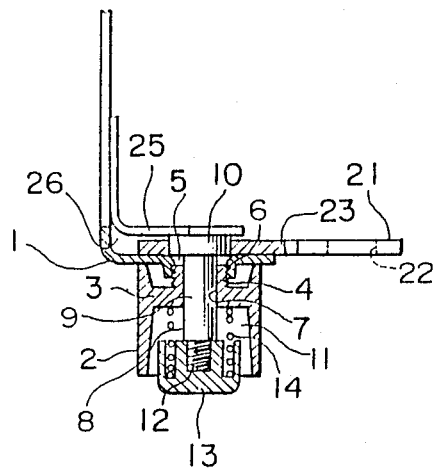
FIG. 1 is a horizontal cross-sectional view showing a main part of an emergency release device in accordance with one embodiment of the present invention.
Figure 2:
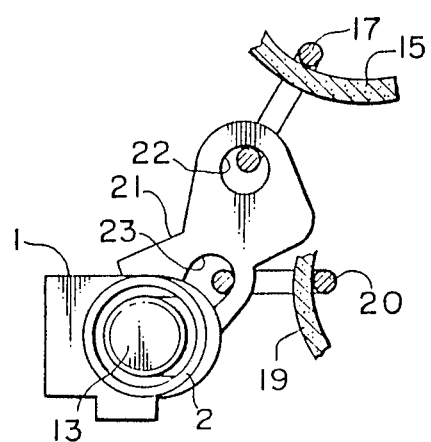
FIG. 2 is a side view showing the main part of the device in FIG. 1.
Figure 3:
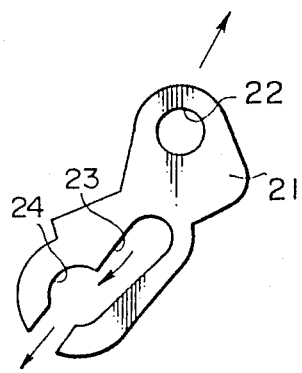
FIG. 3 is a side view of a connecting member used in the device of FIG. 1.

The present invention will be fully described hereinafter with reference to the drawings showing one preferred embodiment.

In the particular embodiment shown in the drawings, a backpack-type working machine according to the present invention includes at the lower portion on the right side of the machine body a plate-like body portion 1 which is bent in an L-shape and extends forwardly of the machine body. On the outer lateral surface of the body portion 1 a cylindrical guard member 2 is fixed. The guard member 2 is integrally formed with a boss portion 4 therewithin and an intermediate wall 3 interposed therebetween. The boss portion 4 is crimpedly secured at the inner end portion 5 into a hole 6 formed on the body portion 1. The boss portion 4 is provided at the central portion with an axially extending bore 7, and the main part 9 of a shaft member 8 is axially slidably extended through and held within this bore 7. The shaft member 8 forms at one end, protruding from the inner end portion 5 of the boss portion 4, an enlarged end portion 10 continuous to the main part 9 of the shaft member 8 and having a diameter larger than that of the bore 7 on the boss portion 4 of the guard member 2, which enlarged end portion 10 contacts with the boss portion 4 of the guard member 2 and the body portion 1 in order to prevent the shaft member 8 from further axial sliding. The other end of the shaft portion 8 terminates within the cylindrical inner space 11 of the guard member 2 and is formed with a screw portion 12. A button member 13 is attached by screwing it onto such a screw portion 12. Also, within the inner space 11 of the guard member 2 there is disposed a herical compression spring 14 exerting force against the intermediate wall 3 of the guard member 2 and the button member 13, which spring 14 brings the distal end portion of the button member 13 into outward displacement out of the inner space 11 of the guard member 2 while it holds the shaft member 8 in such a condition that the enlargedend portion 10 of the shaft member 8 abuts against the boss portion 4 of the guard member 2 and the body portion 1.

Further, the backpack-type working machine shown in the drawings is provided with a pair of shoulder bands 15 and 16 whose upper ends are connected to the upper portion of the machine body, and a ring 17 engages with the lower end of the right side shoulder band 15. The left side shoulder band 16 includes an additional ring 18 attached to its lower end, which connects to the left end of a waist band 19. The right end of such a waist band 19 is also provided with a ring 20 attached. thereon. The ring 17 of the right shoulder band 15 passes through a hole 22 formed at one end of the upper end portion of a connecting member 21 to couple with this member 21.

The connecting member 21 is made of a relatively elongated plate-like steel material or the like, and in addition to the hole 22, it forms a groove slot 23 opening toward the opposite end of the connecting member 21 and extending longitudinally inwardly. The groove slot 23 has a width which enables the ring 20 of the waist band 19 and the main part 9 of the shaft member 8 to loosely contact with and easily move longitudinally along the groove slot 23. Further, the groove slot 23 forms an arcuately enlarged groove slot portion 24 at the central portion. This arcuately enlarged groove slot portion 24 is formed so that the enlarged end portion 10 of the shaft member 8 may fit into it to restrict the connecting member 21 from longitudinal relative movement along the groove slot 23. Disposed in spaced relation on the back side of and parallel to the body portion 1 is a guide member 25, which ensures easy operation for the connecting member 21 when it enters in and comes out of a space 26 defined between the body portion 1 and guide member 25 and avoids excessive axial displacement of the shaft member 8.

According to the structure of the above embodiment, when the button member 13 is pushed into the guard member 2 against the action of the spring 14 so as to displace the enlarged end portion 10 of the shaft member 8 out of the space 26 between the body portion 1 and the guide member 25, the main part 9 of the shaft member 8 may occupy the space 26. The ring 20 of the waist band 19 is passed through the groove slot 23, and the connecting member 21 is then inserted from its leading lower portion into the space 26 so that the main part 9 of the shaft member 8 extending through the space 26 locates in the groove slot 23 of the connecting member 21 and is allowed to align with the arcuately enlarged groove slot portion 24 in the groove slot 23 of the connecting member 21. When the pushed button is released under these conditions, the button member 13 and the shaft member 8 reversely return to their initial positions by the action of the spring 14. The enlarged end portion 10 of the shaft member 8 is moved until it contacts with the guard member 2 and the body portion 1, while coming into contact with the arcuately enlarged groove slot portion 24 of the connecting member 21, thereby holding the connecting member 21 nondetachably from the body portion 1. In this manner, an operator can manipulate satisfactorily the working machine in close contact to the operator's body by using the shoulder bands 15, 16 and the waist band 19.

When an emergency happens where it becomes necessary to dislodge the working machine from the body as quickly as possible, the operator will push the button 13 into the guard member 2. Thus the enlarged end portion 10 of the shaft member 8 leaves the arcuately enlarged groove slot portion 24 of the connecting member 21, and the main part 9 having the smaller diameter of the shaft member 8 in turn moves into the enlarged groove slot portion 24. Accordingly, the connecting member 21 is pulled upwardly by dead load of the falling working machine so that the ring 20 of the waist band 19 and the main part 9 of the shaft member 8 may be released from the groove slot 23 to conveniently dislodge the working machine from the operator.

What is claimed is:

1. An emergency release device for a backpack-type working machine characterized in that said release device comprises a cylindrical guard member mounted on the body portion of the working machine, a shaft member which includes a main part slidably extending through a bore in the boss portion of the guard member and an enlarged end portion formed at one end thereof, a button member attached on the other end portion of said shaft member, a spring exerting force between said guard member and said button member and biasing the enlarged end portion to contact with said boss portion of the guard member, and a connecting member whose upper portion is connected to the lower end portion of the shoulder band, and in that said connecting member is formed with a groove slot whose lower portion opens and into which a waist band and the main part of said shaft member can loosely fit, and said groove slot forms an enlarged groove slot portion which can be engaged with the enlarged end portion of said shaft member.

* * * * *